United States Patent
Byun

(10) Patent No.: US 10,668,967 B2
(45) Date of Patent: Jun. 2, 2020

(54) MOUNT HAVING STRUCTURE WHEREIN COUPLING MEANS IS COVERED, AND LOCKING DEVICE FOR MEANS OF TRANSPORTATION USING SAME

(71) Applicant: Happy & Good, Corp., Gyeonggi-do (KR)

(72) Inventor: Jong Sub Byun, Gyeonggi-do (KR)

(73) Assignee: HAPPY & GOOD, CORP., Gyeonggi-Do (KR)

( * ) Notice: Subject to any disclaimer, the term of this patent is extended or adjusted under 35 U.S.C. 154(b) by 70 days.

(21) Appl. No.: 15/576,279

(22) PCT Filed: May 23, 2016

(86) PCT No.: PCT/KR2016/005456
§ 371 (c)(1),
(2) Date: Nov. 21, 2017

(87) PCT Pub. No.: WO2016/190643
PCT Pub. Date: Dec. 1, 2016

(65) Prior Publication Data
US 2018/0141603 A1 May 24, 2018

(30) Foreign Application Priority Data
May 22, 2015 (KR) .................. 10-2015-0072189

(51) Int. Cl.
*B62H 5/00* (2006.01)
*B62H 3/02* (2006.01)
(Continued)

(52) U.S. Cl.
CPC .............. *B62H 5/005* (2013.01); *B60L 53/12* (2019.02); *B60L 53/31* (2019.02); *B62H 3/02* (2013.01);
(Continued)

(58) Field of Classification Search
CPC .......... B62H 5/005; B62H 3/02; B62H 5/003; B62H 5/20; B62H 2003/005; B60L 53/12;
(Continued)

(56) References Cited

U.S. PATENT DOCUMENTS 5,889,463 A * 3/1999 Judd ................... B60R 25/1001
340/425.5
6,147,603 A * 11/2000 Rand .................. G08B 13/1418
340/568.2
(Continued)

FOREIGN PATENT DOCUMENTS

JP 6-299751 10/1994
KR 10-0965223 6/2010
(Continued)

OTHER PUBLICATIONS

International Preliminary Report on Patentability (Chapter I) dated Nov. 28, 2017 for PCT/KR2016/005456 and its English translation from WIPO.
(Continued)

*Primary Examiner* — James J Yang
*Assistant Examiner* — Kevin Lau
(74) *Attorney, Agent, or Firm* — Ladas & Parry, LLP

(57) ABSTRACT

The present invention relates to a locking device, which is capable of directly locking the body of a means of transportation, such as a bicycle or a light electric vehicle (LEV), regardless of the shape or size thereof, and to a locking device for a means of transportation, which is provided with a mount simply and securely mounted on a tubular frame of the means of transportation, wherein a rack is provided with brackets coupled to the mount and provided at one end of articulated cables, which are fixed to a fixture, so that not only is the locking device securely locked simply by cou-
(Continued)

pling the brackets provided on the rack to the mount mounted on a user's means of transportation, even if the user does not carry a separate lock, but a coupling means, which is capable of disassembling the mount, is covered by the coupling with the brackets when the locking device is locked, thereby significantly reducing the risk of theft during parking.

6 Claims, 7 Drawing Sheets

(51) Int. Cl.
G07C 9/00 (2020.01)
B60L 53/31 (2019.01)
B60L 53/12 (2019.01)
G07C 9/28 (2020.01)
E05B 47/00 (2006.01)
B62H 5/20 (2006.01)
B62H 3/00 (2006.01)

(52) U.S. Cl.
CPC .............. *B62H 5/003* (2013.01); *B62H 5/20* (2013.01); *E05B 47/00* (2013.01); *G07C 9/00* (2013.01); *G07C 9/28* (2020.01); *B60L 2200/12* (2013.01); *B62H 2003/005* (2013.01)

(58) Field of Classification Search
CPC ...... B60L 53/31; B60L 2200/12; E05B 47/00; G07C 9/00; G07C 9/00111
See application file for complete search history.

(56) References Cited

U.S. PATENT DOCUMENTS

| | | |
|---|---|---|
| 2012/0324966 A1 | 12/2012 | Dallaire et al. |
| 2015/0074004 A1* | 3/2015 | Song .................... G07F 17/0057 705/307 |
| 2015/0152668 A1* | 6/2015 | Assenat .................... B62H 3/02 70/277 |
| 2016/0222715 A1* | 8/2016 | Peck ........................ A47C 7/62 |

FOREIGN PATENT DOCUMENTS

| | | |
|---|---|---|
| KR | 10-1154287 | 6/2012 |
| KR | 10-1253911 | 4/2013 |
| KR | 10-1299414 | 8/2013 |
| KR | 2015132675 A * | 11/2015 |

OTHER PUBLICATIONS

Notice of Allowance dated Mar. 22, 2017 for Korean Patent Application No. 10-2015-0072189 and its English by Global Dossier.
Office Action dated Aug. 10, 2016 for Korean Patent Application No. 10-2015-0072189 and its English by Global Dossier.
International Search Report for PCT/KR2016/005456 dated Aug. 24, 2016 and its English translation from WIPO.
Written Opinion of the International Searching Authority for PCT/KR2016/005456 dated Aug. 24, 2016 and its English machine translation by Google Translate.

* cited by examiner

MOUNT HAVING STRUCTURE WHEREIN COUPLING MEANS IS COVERED, AND LOCKING DEVICE FOR MEANS OF TRANSPORTATION USING SAME

CROSS-REFERENCE TO RELATED APPLICATIONS

This application is the U.S. National Stage of International Patent Application No. PCT/KR2016/005456 filed on May 23, 2016, which claims the priority to Korean Patent Application No. 10-2015-0072189 filed in the Korean Intellectual Property Office on May 22, 2015, the entire contents of which are incorporated herein by reference.

TECHNICAL FIELD

The present invention relates to a locking device, which is capable of directly locking a body of a transportation means, such as a bicycle or a light electric vehicle (LEV), regardless of the shape or size thereof. More particularly, the invention relates to a locking device for a transportation means, which is provided with a mount simply and securely mounted on a tubular frame of the transportation means, wherein a rack is provided with brackets coupled to the mount and provided at one end of articulated cables, which are fixed to a fixture, so that not only is the locking device securely locked simply by coupling the brackets provided on the rack to the mount mounted on a user's transportation means, even if the user does not carry a separate lock, but a coupling means, which is capable of disassembling the mount, is covered by the coupling with the brackets when the locking device is locked, thereby significantly reducing the risk of theft during parking.

BACKGROUND ART

As bicycle theft accidents increase, a variety of locking devices has been proposed. However, thefts are not still reduced because of thieves aiming for structural weak points. As illustrated in FIG. 1, a conventional locking device configured to constrain wheels is problematic in that it is difficult to prevent the commission of thefts for wheels other than the constrained wheel, and a weak spoke may be damaged, namely, bent or broken by impact applied while the bicycle is stored.

Meanwhile, the locking device illustrated in FIG. 2 adopts a method of fixing a bicycle by holding a frame corresponding to a body of the bicycle, thus ensuring more secure locking and achieving higher security effects. However, since all bicycles should have mounts at uniform heights and positions to facilitate a coupling operation, this locking device may be applied to public bicycles having uniform sizes and shapes, but may not used for private bicycles having various sizes and shapes.

DISCLOSURE

Technical Problem

Accordingly, the present invention has been made keeping in mind the above problems occurring in the related art, and is intended to provide a locking device for a transportation means, in which a body of the transportation means is provided with a mount that is simply mounted and covers a coupling structure when the transportation means is being parked, thus making it impossible to maliciously disassemble, and a rack is provided with an articulated cable that may reach the mount regardless of its height, direction and position and a bracket that is provided on an end of the cable to be coupled with the mount, thus allowing the transportation means to be securely locked simply by coupling the bracket provided on the rack to the mount provided on the transportation means even if a user does not carry a separate lock.

Technical Solution

In order to accomplish the above object, the present invention provides a locking device for transportation means in a parking system configured to lock/unlock a body of the transportation means to/from a fixture of the rack, wherein the body of the transportation means may include a mount in which RFID information for specifying a user or the transportation means may be recorded, and the rack may include a bracket mechanically coupled with the mount and having a reader reading RFID information recorded in the mount or RFID information with which a user makes contact; an articulated cable fixed at one side thereof to the bracket and at the other side thereof to the fixture of the rack, and having at least one joint that is bendable so that the bracket may reach the mount regardless of a height, a direction and a position of the mount by a user's adjustment; and a lock configured to lock/unlock the coupling of the mount and the bracket based on the RFID information read by the reader.

A coupling structure for mounting the mount on the body may be provided on a junction of the mount and the bracket to cover the coupling structure if the mount is combined with the bracket.

The coupling structure of the mount may include a band on which at least one catching groove having directivity may be formed, and a hook on which at least one catching step may be formed to engage with the catching groove in a saw-tooth manner, whereby, if the band is fitted into the hook in a predetermined direction in a state where the band and the hook surround the body, the release of a coupling may be impossible in a direction opposite to the direction where the band may be fitted into the hook while the catching groove may engage with the catching step.

The coupling structure of the mount may include a clamp attached to surround the body by spreading an open coupling surface; and a wedge fitted into predetermined grooves formed on both facing sides with respect to the coupling surface of the clamp to prevent the coupling surface from being opened.

The rack may further include a controller comparing information read by the reader with information registered in a database of a server through a network to control the lock according to the compared result.

The joint may be a structure of coupling a spherical ball with a concave groove into which the ball may be fixedly inserted, and the ball may freely perform a hinge motion in the groove to allow each joint to be freely bent.

An uneven rail 21 and guide bar may be formed on contact surfaces of the mount and the bracket to be mechanically combined with each other, so that a coupling operation may be performed while the guide bar 13 of the mount 10 may slide along the rail 21 of the bracket 20.

A first sensing line for detecting a theft based on an electric disconnection and a second sensing line for detecting the disconnection of the articulated cable may be further provided in the band of the mount, and the device may further include an alarm device of giving alarm if the disconnection is detected in either of the first sensing line or the second sensing line.

The articulated cable may be implemented as a bellows tube.

The mount may include a rechargeable battery, and the bracket may include a wireless charger to charge the battery.

The mount may further include an LED.

A Bluetooth-based beacon module may be provided in the mount.

The locking device may further include a bending sensor to detect the bending of the joint, the alarm device giving alarm if the bending of the articulated cable is detected by the bending sensor in a state where the transportation means is being parked.

Advantageous Effects

The present invention provides a locking device, which ensures more secure locking and has higher security effects, for various bicycles having various sizes and shapes. Thus, it is unnecessary for a user to separately purchase and carry a heavy lock, thus relieving financial burden and obviating the necessity of carrying a key. Moreover, the invention completes the locking operation of the bicycle simply by coupling a bracket to the mount instead of putting a chain around the bicycle at a narrow space and fastening a lock, thus significantly improving a user's convenience.

Further, since the identification of a bicycle user is performed by an RFID tag installed in the mount, it is possible to solve a problem wherein a bicycle is left alone on a rack for a lengthy period of time and undesirably occupies a space, thus making it difficult to manage. If a system is configured such that only a bicycle having the recognized RFID tag may use a parking service in a depository, a bicycle user will voluntarily mount the mount on his or her bicycle, thus naturally attaining bicycle registration effects. Therefore, a management agency of a local government may build a database for bicycles, thus efficiently managing the bicycles.

Furthermore, if the mounting of a mount is universalized by the above-described process, it is easy to confirm and find a lost or stolen bicycle and it is difficult to resell a stolen bicycle, thus consequently reducing the theft and loss of the bicycle.

Further, a battery of a bicycle when it is being parked may be efficiently charged by a wireless charger, and it is possible to confirm a position in real time and check a running path using a beacon if an access point (AP) is installed at a main point on a bikeway or the like.

BRIEF DESCRIPTION OF THE DRAWINGS

The accompanying drawings are intended to illustrate the preferred embodiments of the invention, and aid in understanding the technical spirit of the invention when reading the following description. It is to be interpreted that the invention is not limited to embodiments shown in the drawings.

BEST MODE FOR THE INVENTION

Exemplary embodiments of the present invention will be described below in more detail with reference to the accompanying drawings.

Figure 1:
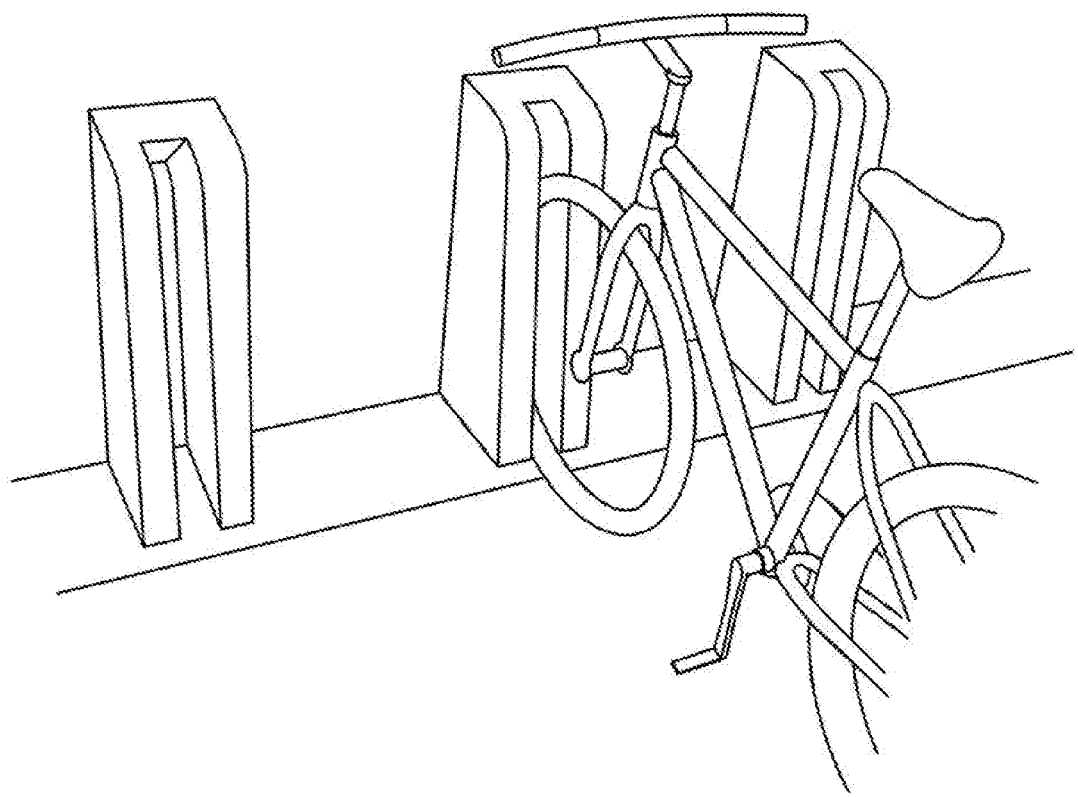
FIG. 1 is a view illustrating a conventional wheel-fixed bicycle locking device.
Figure 2:
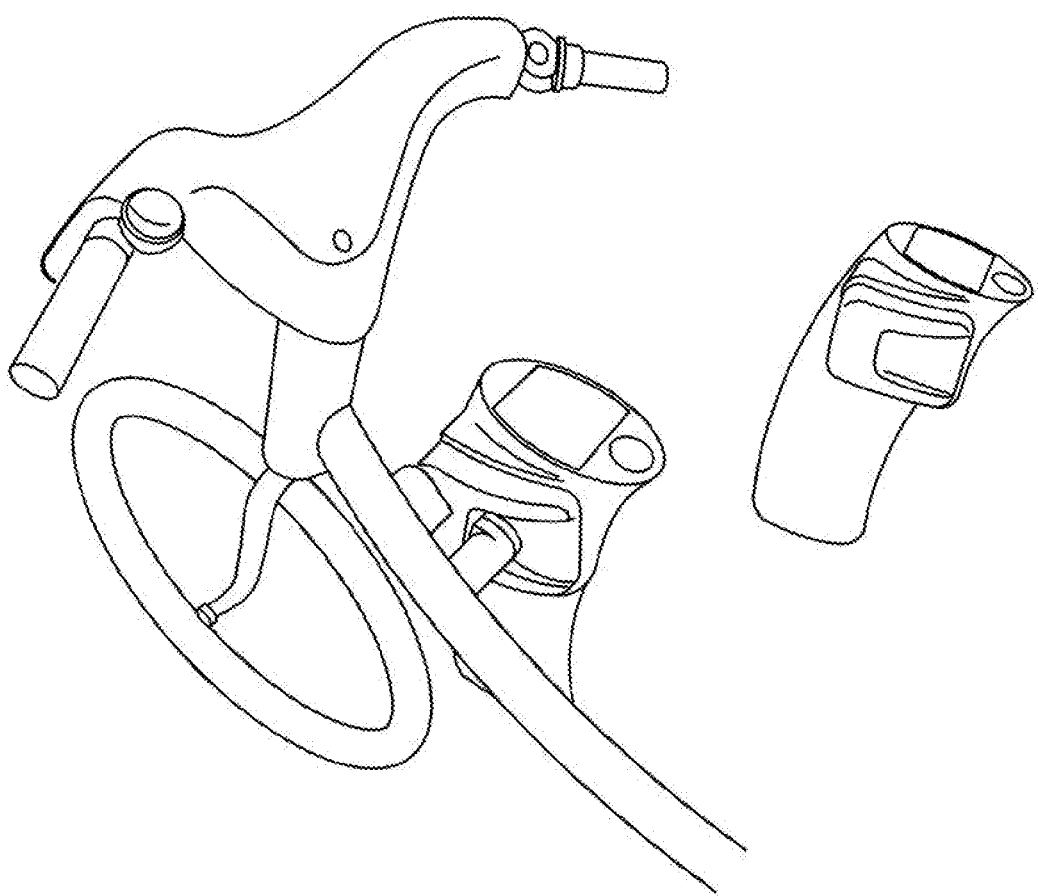
FIG. 2 is a view illustrating a conventional frame-fixed bicycle locking device.
Figure 3:
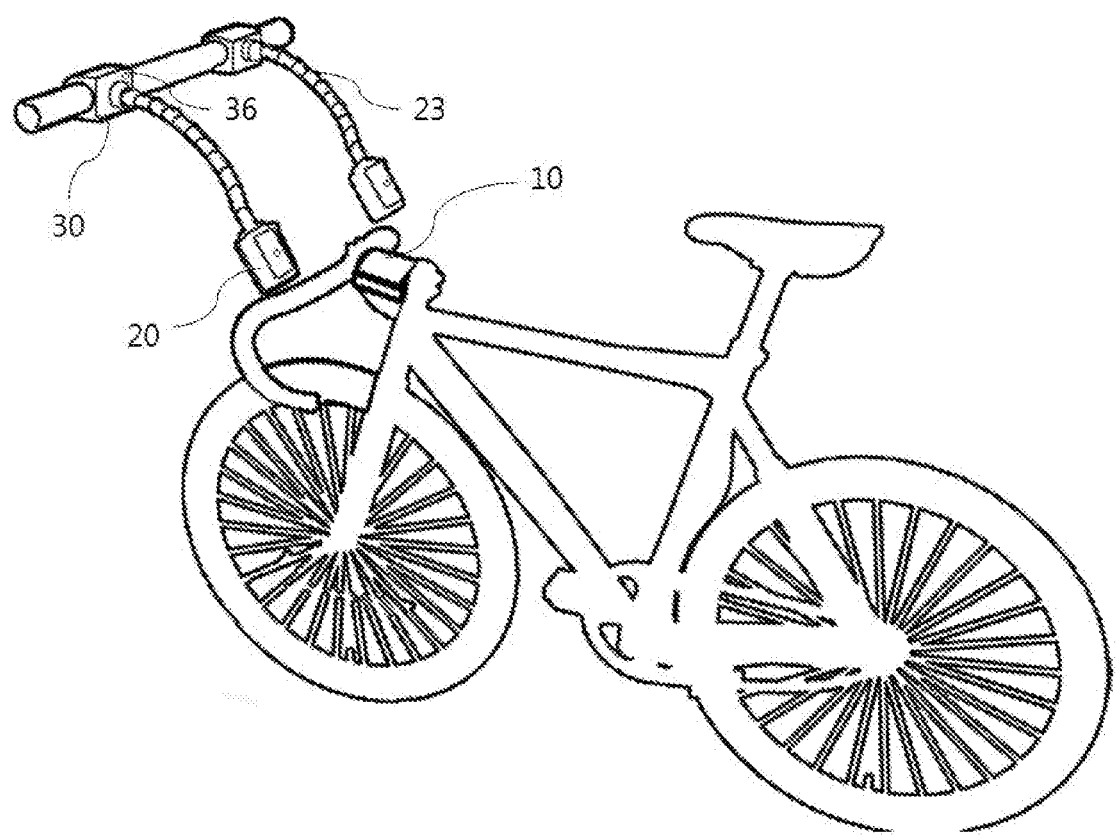
FIG. 3 is a view illustrating a bicycle mount and a locking device using the mount according to a first embodiment of the present invention.
Figure 4:
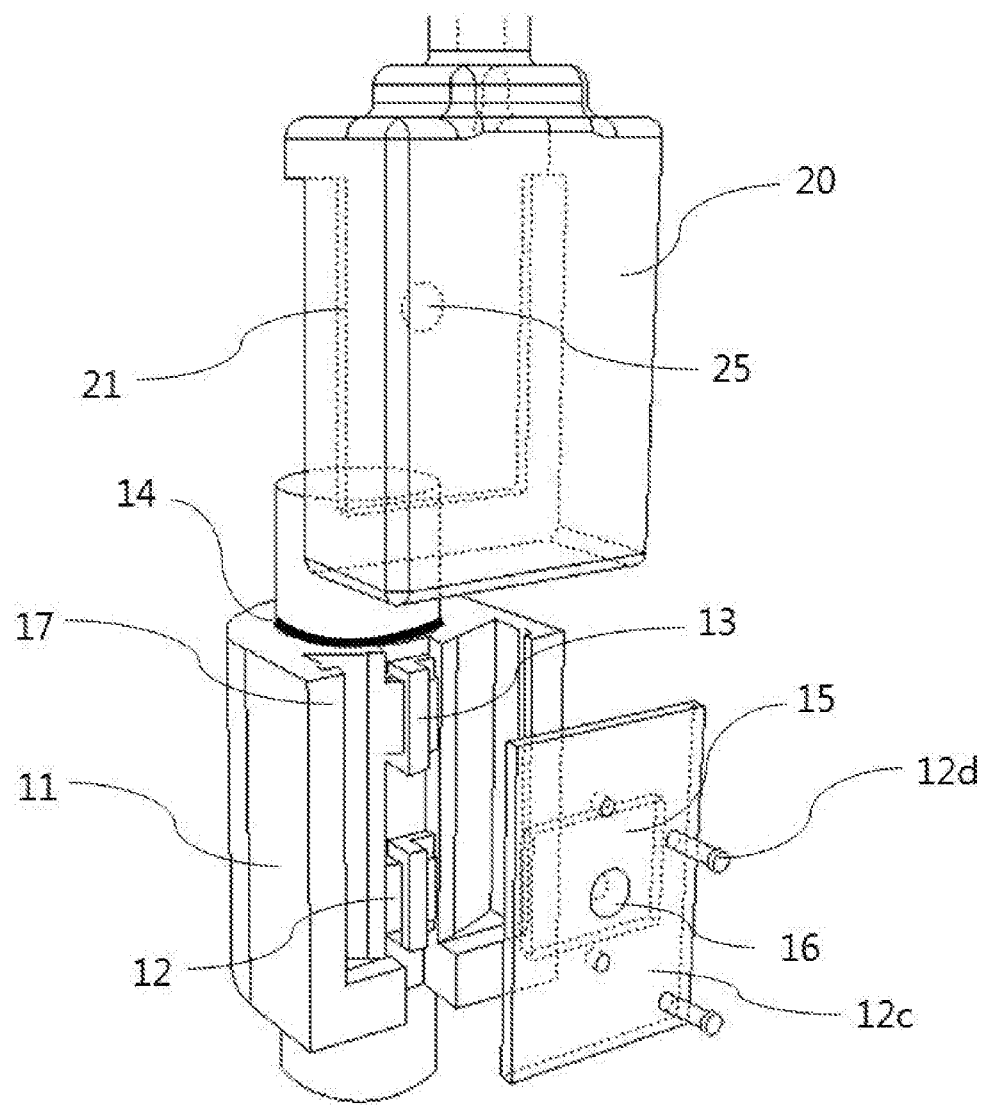
FIG. 4 is a detailed view illustrating the structure of the mount and a bracket in the device having the configuration of FIG. 3.
Figure 5:
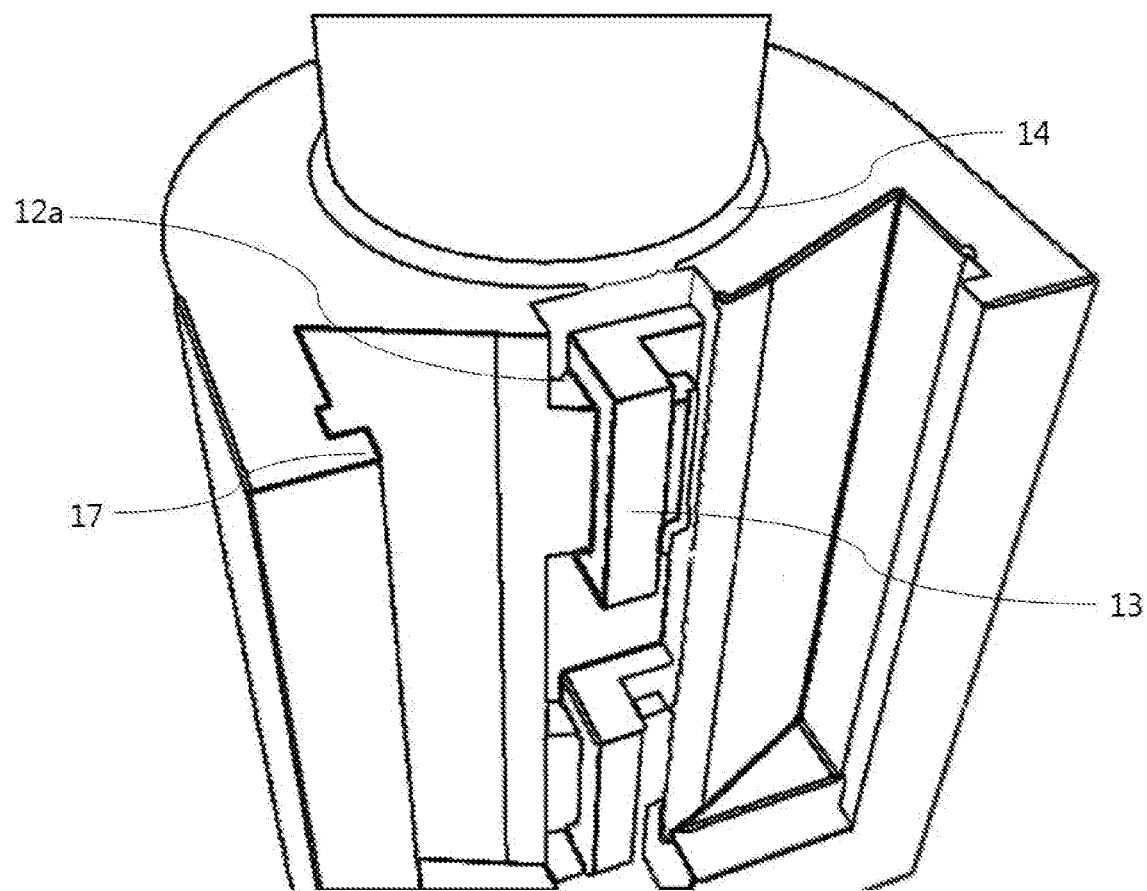
FIG. 5 is a view illustrating a coupling structure of the mount with the bracket.

FIG. 3 is a view illustrating a locking device of a bicycle that is a representative transportation means according to a first embodiment of the present invention. As illustrated in FIGS. 4 and 5 in detail, a coupling structure of a mount 10 mounted on the bicycle includes a body 11, a band 12, and a hook 13. A plurality of catching grooves 12a is formed on the band 12 and at least one catching step is formed on the hook 13 so that the catching grooves engage with the catching step in a saw-tooth manner. Once the catching groove 12a of the band is fitted into the catching step of the hook in a cable-tie coupling manner, this coupling structure makes it impossible to separate the catching step from the catching groove in an opposite direction unless a cutting operation is performed. After a tubular bicycle frame is fitted into an open seam of the mount, the band and the hook are tightly fastened to each other using the flexibility of plastics. Thus, an inner surface of the mount comes into close contact with the tubular frame, so that the mount is securely mounted on the frame while preventing slip. Meanwhile, a soft rubber packing 14 may be further provided to prevent the mount from slipping along the frame and prevent water from being penetrated.

Since the frame of the bicycle has a tubular structure, a user may simply and securely mount the mount on any place of the bicycle frame.

Figure 6:
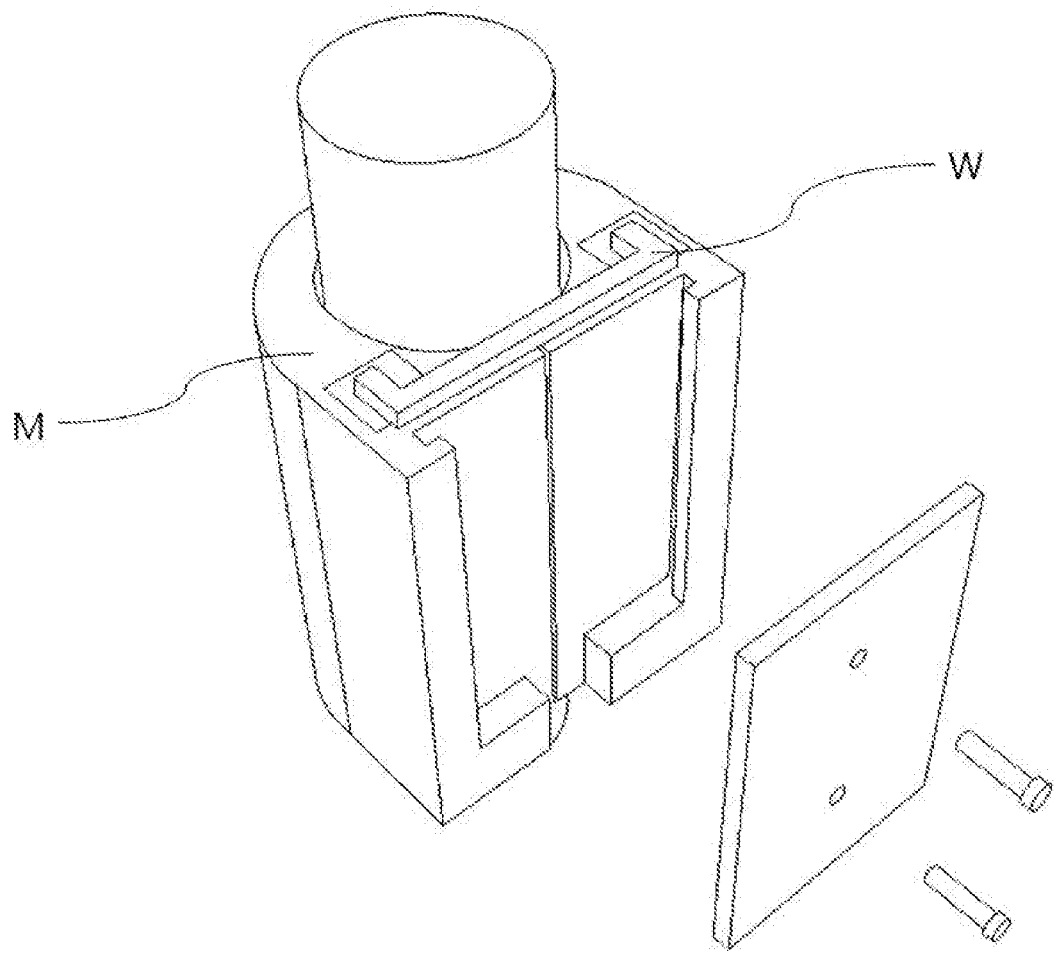
FIG. 6 is a view illustrating a coupling structure of a clamp with a wedged mount.

According to another embodiment, as illustrated in FIG. 6, a mount coupling structure may be implemented by a C-shaped clamp M that is open at a side thereof, and a wedge W that is fitted into predetermined grooves formed on both facing sides with respect to a coupling surface of the clamp so as to prevent the clamp from being spread, thus securely coupling the clamp to the frame of the bicycle.

The mount 10 may be preferably made of high-strength plastic resin having high heat resistance and impact resistance. However, the mount may be partially or entirely made of other materials, such as metal or ceramic, in view of durability and wear resistance.

If the mount 10 is made of plastic resin materials, it may be more easily and securely mounted to any place while surrounding the tubular bicycle frame.

An RFID tag 15 may be provided in the mount as desired to contain information for confirming or checking a user's name, contact information and others or product information of a bicycle itself, such as the model name, kind or color of the bicycle.

Figure 7:
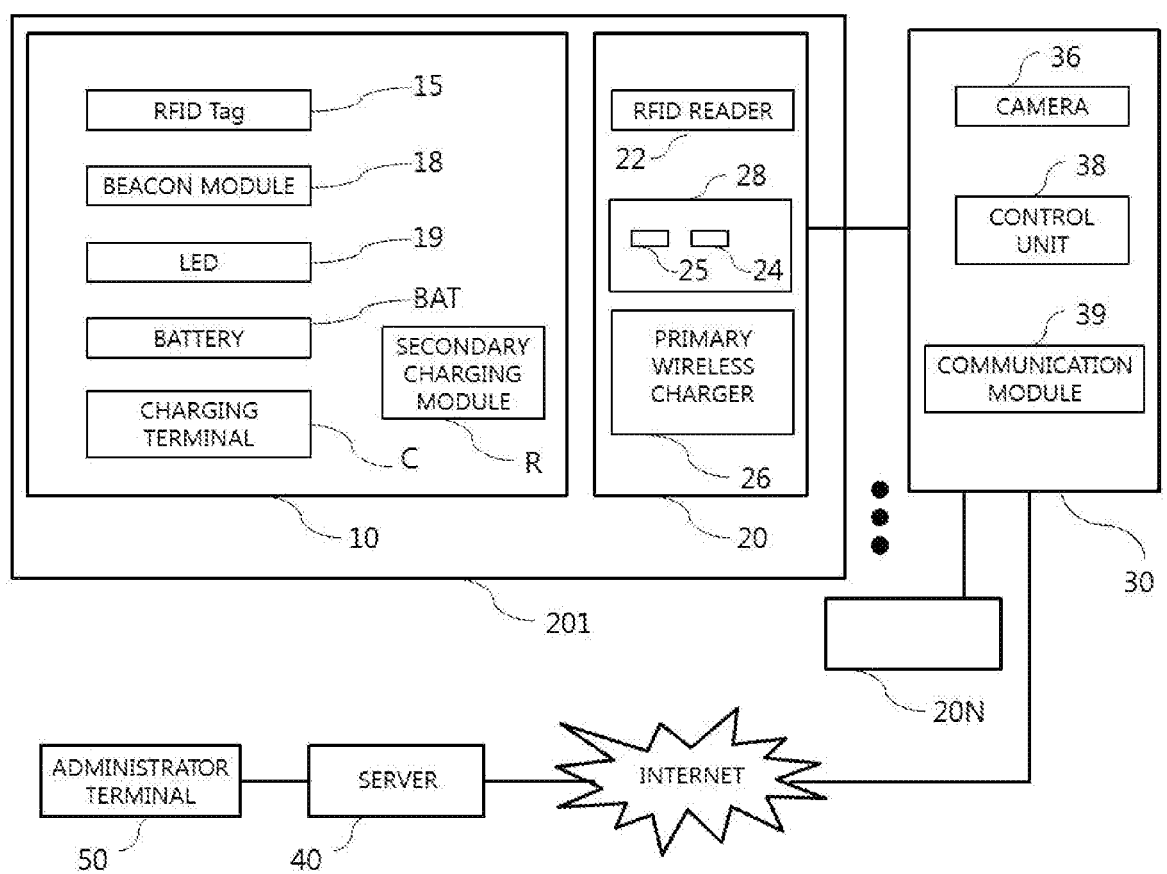
FIG. 7 is a view illustrating a parking system of a transportation means according to a second embodiment of the present invention.

Further, as illustrated in FIG. 7, a reader 22 may be provided in the bracket 20 to read information that is recorded in the RFID tag 15. The read information is transmitted through a controller 30 to a server 40 via a network to compare with information registered in a database 41. The controller 30 controls various operations including RFID tag recognition, locking/unlocking operation and charging operation for multiple brackets while communicating with the server 40. However, the controller or the server is optionally employed. That is, the standalone reader may perform a control function of individually locking or unlocking each bracket without separately using the controller or the server. The reader simply sets the locking operation based on the recognized information when the bicycle is parked, and sets the unlocking operation depending on whether associated information is recognized again.

Meanwhile, in the embodiment illustrated in FIG. 3, a camera 36 is installed in the controller 30 to allow a user to observe a parking state of the bicycle online in real time.

The bracket 20 may be mounted on one end of an articulated cable 23 that is freely bendable. The other end of the articulated cable 23 is securely fixed to a frame of a rack. Meanwhile, a bellows tube may be used instead of the articulated cable.

The articulated cable 23 may be implemented as a coupling structure of a spherical ball and a bearing surrounding the ball. Here, since the ball freely performs a hinge motion in the bearing, free bending is possible at each joint and internal electrical connection is maintained using a brush or the like.

If a limiter is provided in the groove to limit the motion of the ball in a predetermined direction, it is possible to limit the bending operation in a certain direction or allow the joint to be bent only in a certain direction.

Therefore, an operator may couple the bracket regardless of the size or shape of the bicycle or a position or point where the mount is placed as illustrated in FIG. 3, by adjusting the number and length of the joint and the presence of the limiter.

The mechanical structure of the joint may perform an important function of preventing thefts by absorbing some of force through the flexibility of the joint movement, when an evil thief attempts to separate the mount from the bracket with strong force, in addition to the function of freely adjusting a position where the bracket may reach.

An uneven rail 21 and guide bar 17 are formed on contact surfaces of the mount 10 and the bracket 20 to be mechanically combined with each other. For example in a coupling operation, the guide bar 17 of the mount 10 slides along the rail 21 of the bracket 20 to lock the mount and the bracket under a given condition.

The given condition may be assumed as a condition where information read from the RFID tag of the mount 10 matches with information registered in the database. The registered information of the database may be information acquired from a user through an administrator terminal 50 when the bicycle is registered.

A locking operation may be performed as follows: the controller of the rack actuates a stopper 25 through a motor or a solenoid 24 provided on the bracket 20 based on a checked result transmitted from the server to cause this stopper 25 to be caught by a locking step 16 of the mount, thus preventing the mount from being separated from the bracket, or maintaining a locked state while a body of the bracket does not slide along the mount in a direction opposite to that of the coupling operation.

An unlocking process may be performed as follows: if the RFID tag or a mobile phone equipped with an NFC for the purpose of identification approaches a wireless recognition part such as a second RFID reader (not shown) inserted into an upper portion of the bracket, the controller makes an identification based on the information registered in the database and then unlocks the locking device if appropriate.

Further, it is possible to perform both the bicycle information recognition and the user information recognition using the reader 22 without a separate second RFID reader.

Meanwhile, in the mount, the seam of the cable tie-type band is covered and protected by a cover 12c. The cover 12c is fastened by a bolt 12d. If the bracket that will be described later is coupled to the mount, an integral coupling structure of the bolt, the rail and the guide bar is covered by the bracket.

The present invention may be variously changed or modified without departing from the scope of the invention. For example, a sensing line may be inserted into the band of the mount or the articulated cable to detect a theft depending on whether there occurs electrical disconnection. In this case, if a thief damages the band for the theft, the controller detects the damage to the band via a sensor, and then sounds the alarm and gives the alarm to a user through the network. Further, if the joint is cut, this is also considered as the theft to give the alarm to a user.

Meanwhile, a device having the configuration of FIG. 7 includes a high-luminance LED 19 provided in the mount to be used in night running, a Bluetooth-based beacon 18 for confirming the position and running path of the bicycle, a mobile-phone charging terminal C, and a wireless charging type of battery BAT for supplying power to these electronic devices. Correspondingly, the bracket 20 is provided with a wireless charger 26 to charge a battery in the mount.

Moreover, a locking device 28 having the solenoid 24 and the stopper 25 is installed in the bracket 20, and a communication module 39 is provided in the controller 30 to make a control unit 38 for controlling the device and the server 40 communicate with each other.

Further, a sensor 37 is provided on the articulated cable to detect the bending motion of the joint in a parked state.

Therefore, in the device having the above configuration, the battery may be charged in a wireless charging method while the bicycle is parked, a driver's mobile phone may be charged or an LED may be driven by the power of the battery to turn on a headlight or a turn indicator at night, and the beacon may be used to provide various services, for example, check a location in the case of a loss or confirm a running path. Further, if any person lifts the bicycle to detach a wheel from the parked bicycle, the controller detects this situation via the sensor to sound the alarm or transmit the alarm to a user.

Meanwhile, when the sensing line in the band of the mount is cut, the controller may be configured to transmit a disconnection sensing signal through the beacon to a wireless channel.

The present invention is applicable to various types of transportation means including a bicycle, a single- or two-seater scooter, an electric bicycle, and Segway. The wireless charging device may be used to charge the battery that is used as a power source of these transportation means.

As described above, the present invention may be used to realize a solution including a locking device that is capable of directly locking a body of a transportation means, such as a bicycle or a light electric vehicle (LEV), regardless of the shape or size thereof, and a parking system, a control device or a charging system using the locking device.

The invention claimed is:

1. A mount for a transportation means, mounted on body of a transportation means configured to couple the transportation means to a locking device of a parking system, wherein the mount includes a RF tag recorded RFID information for specifying a user or the transportation means, and a coupling structure to be mounted on the body of the transportation means, wherein the coupling structure includes:

C-shaped clamp that is open at a side thereof; and a wedge configured to prevent the clamp from being opened, and wherein the coupling structure is a structure covered by the locking device by coupling the mount with the locking device, and wherein an uneven rail and guide bar are formed on contact surfaces of the mount and a bracket to be mechanically combined with each other, so that a coupling operation is performed while the guide bar slides along the rail.

2. A parking system for a transportation means configured to lock/unlock a body of the transportation means to/from a fixture of the rack, wherein the body of the transportation means comprises:

a mount in which RFID information for specifying a user or the transportation means is recorded, and a coupling structure mounting the mount on the transportation means, wherein the coupling structure is a structure covered by a locking device by coupling the mount with the locking device, wherein the rack comprises:

a bracket mechanically coupled with the mount and having a reader reading RFID information recorded in the mount or RFID information with which a user makes contact;

an articulated cable fixed at one side thereof to the bracket and at the other side thereof to the fixture of the rack, and having at least one joint that is bendable so that the bracket may reach the mount regardless of a height, a direction and a position of the mount by a user's adjustment; and a lock configured to lock/unlock the coupling of the mount and the bracket based on the RFID information read by the reader, and wherein an uneven rail and guide bar are formed on contact surfaces of the mount and the bracket to be mechanically combined with each other, so that a coupling operation is performed while the guide bar slides along the rail.

3. The parking system for the transportation means of claim 2, wherein the coupling structure includes a C-shaped clamp that is open at a side thereof, and a wedge configured to prevent the clamp from being opened.

4. The parking system for the transportation means of claim 2, the rack further comprises:

a controller comparing information read by the reader with information registered in a database of a server through a network to control the lock according to the compared result.

5. The parking system for the transportation means of claim 2, wherein the mount comprises a rechargeable battery, and the bracket comprises a wireless charger to charge the battery.

6. The parking system for the transportation means of claim 2, wherein a first sensing line for detecting a theft based on an electric disconnection and a second sensing line for detecting the disconnection of the articulated cable are further provided in a band of the mount, and the parking system further comprises an alarm device of giving alarm if the disconnection is detected in either of the first sensing line or the second sensing line.

* * * * *